US008142833B2

(12) United States Patent
Lubbers et al.

(10) Patent No.: US 8,142,833 B2
(45) Date of Patent: Mar. 27, 2012

(54) CLEAR SILICONE MATERIAL FOR THE REGISTRATION OF FINGERPRINTS

(75) Inventors: Dierk Lubbers, Altstatten (CH); Stephan Lampl, Luchingen (CH); Ralf Kollefrath, Ruethi (CH)

(73) Assignee: Coltene AG, Altstatten (CH)

( * ) Notice: Subject to any disclaimer, the term of this patent is extended or adjusted under 35 U.S.C. 154(b) by 965 days.

(21) Appl. No.: 11/328,508

(22) Filed: Jan. 9, 2006

(65) Prior Publication Data

US 2006/0165871 A1    Jul. 27, 2006

Related U.S. Application Data

(60) Provisional application No. 60/647,519, filed on Jan. 27, 2005.

(51) Int. Cl.
*A61B 5/117* (2006.01)
(52) U.S. Cl. .............. 427/1; 382/124; 396/15; 206/558; 264/222; 264/220; 264/225; 118/31.5

(58) Field of Classification Search ...... 427/1; 206/568, 206/558; 264/222, 220, 225; 118/31.5; 382/124; 396/15
See application file for complete search history.

(56) References Cited

U.S. PATENT DOCUMENTS

| | | | | |
|---|---|---|---|---|
| 2,986,831 A | * | 6/1961 | Terek et al. | 264/299 |
| 3,138,059 A | * | 6/1964 | White | 396/15 |
| 4,153,970 A | * | 5/1979 | Perkinson | 292/336.3 |
| 5,348,159 A | * | 9/1994 | Watkin et al. | 206/568 |

* cited by examiner

*Primary Examiner* — Christina Johnson
*Assistant Examiner* — Saeed Huda
(74) *Attorney, Agent, or Firm* — Katten Muchin Rosenman LLP

(57) ABSTRACT

The present invention is related to clear crosslinkable polymeric masses for the registration of fingerprints, allowing to obtain positive reproductions of fingerprints by taking a photograph through a clear cured layer obtained from said polymeric masses.

5 Claims, 1 Drawing Sheet

CLEAR SILICONE MATERIAL FOR THE REGISTRATION OF FINGERPRINTS

CROSS-REFERENCE TO RELATED APPLICATION

This application claims priority from U.S. Provisional Application 60/647,519, filed Jan. 27, 2005, the contents of which are herein wholly incorporated by reference.

The present invention is related to clear silicone materials and the use thereof for the registration of fingerprints.

The detection of fingerprints is a very important tool for criminal investigations. Fingerprints are a characteristic feature of an individual person. It is considered as strong evidence if the fingerprints found at a location where a crime had occurred coincide with the fingerprints of a person suspected to have performed the crime.

Conventionally, fingerprints are detected and collected by first applying a powder such as carbon black or aluminum on the surface of an object to be investigated. By sweeping the surface with a brush it is achieved that the powder adheres to latent fingerprints, if there are any. The fingerprints thus made visible (developed) can be lifted by using adhesive tapes.

If objects having a difficult surface, such as a porous, curved, fragile or textured surface, are to be investigated, the use of adhesive tapes is not possible. For the investigation of such objects, colored polymeric masses have been used. Those polymeric masses are cast on the surface of the object, after fingerprints on said object have been made visible by applying the above-mentioned powders. The polymeric mass is applied onto the developed fingerprint and allowed to cure. The cured polymeric mass is subsequently taken off the surface. Such polymeric, masses have also been used for the registration of tool marks, i.e. the traces caused by tools used for e.g. the burglary. Commercial products are, for example, Mikrosil® or Microcazt® or Coltene® Transfer.

Conventionally, these masses are fast-curing silicone-based polymers. The polymers are mixed, immediately prior to application, with a catalyst, applied onto the developed fingerprint and then allowed to cure. Curing takes several minutes. Depending on the powder which has been used for developing the fingerprint, a mass having a color which provides a maximum contrast with the powder is used. For example, when black powders such as carbon black is used as developing agent, white polymeric masses are preferred, whereas when a silver powder is used, a black polymeric mass is preferred.

The fingerprint impression which can be collected by means of those masses is reversed ("negative") as compared to the original ("positive") fingerprint. This leads to increasing problems in several jurisdictions, which tend to accept only "positive" fingerprint reproductions.

It was therefore the object of the present invention to provide a possibility of obtaining positive fingerprint reproductions from difficult (e.g. curved or uneven) surfaces.

This object has been solved by a clear silicone mass, a process of collecting fingerprints by using a clear polymeric mass, and by the use of said clear polymeric sass for collecting fingerprints.

The present invention is based on the surprising finding that it is possible to collect a fingerprint by using a clear polymeric mass, and to obtain the positive fingerprint by taking a photograph of the collected (negative) fingerprint through said clear polymeric mass from the upper side, i.e. from the side remote from the fingerprint impression.

Thus, the present invention is particularly related to a clear crosslinkable polymeric mass selected from the group consisting of silicone polymers, polyurethane polymers, polyether polymers, polyacrylates, styrene-butadiene-copolymers, and methyl methacrylate copolymers, wherein said mass has a viscosity of from 0.1 to 200 Pas and a tensile strength of from 0.1 to 5 MPa.

It is necessary for the polymer to have an appropriate viscosity, preferably in the above-defined range. Otherwise it is not possible to obtain an adequate impression of a fingerprint by applying said polymeric mass onto the developed fingerprint. The mass would be either to fluent and flow over the surface without taking up the fingerprint impression, or it would be too viscous already before curing and thus also not capable of taking up the fingerprint impression. According to the present invention, it is preferred that the polymeric mass to be used has a viscosity in the range of from 0.1 to 200 Pas, especially preferred from 1 to 50 Pas.

The polymeric mass must result in a cured layer which allows the taking of a photography through the layer. Thus, the mass must be clear. According to the present invention, the term clear means that the cured layer is sufficiently transparent that a photograph showing the details of the fingerprint impression contained in said layer can be taken through said layer. In other words, it must be possible to obtain from the polymeric mass a cured layer having a thickness not exceeding 5 mm. Since with increasing thickness the brilliance of the photography taken through said layer decreases as well as the danger of inclusions of air increases, it is preferred to have a thickness of the cured layer which does not exceed 1 mm, preferably not exceed 0.5 mm and most preferably is less than 0.4 mm.

In order to be able to obtain cured layers with the required thickness, the polymeric mass has to possess an appropriate tensile strength, preferably a tensile strength of at least 0.1 MPa, preferably of more than 1 MPa, and most preferably of 1.5 MPa.

The polymeric mass which can be used according to the present invention is further limited by the requirement that a clear cured layer has to be obtained, in order to allow the taking of photographies through said layer. According to a preferred embodiment of the present invention, the clear mass may be either a crosslinkable silicone polymer, a crosslinkable polyurethane polymer, a crosslinkable polyether polymer, a crosslinkable polyacrylate, a crosslinkable styrene-butadiene-copolymer, or a methyl methacrylate copolymer. The term "crosslinkable" in this respect means that the polymer must comprise functional groups which can react with a crosslinking agent. By means of said reaction, the crosslinking agent can link two or more of the polymer chains, resulting in a three-dimensional network. By means of said crosslinking reaction, a cured layer is obtained from the polymeric mass.

Silicone polymers are from a chemical standpoint polysiloxanes having the general formula

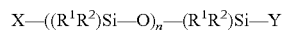

$$X-((R^1R^2)Si-O)_n-(R^1R^2)Si-Y$$

with $R^1$ and $R^2$ being organic residues equal or different from each other, preferably a $C_{1-10}$ alkyl group, and X und Y being terminal groups. $R^1$ and $R^2$ may also comprise functional groups, preferably vinyl groups. n can be an integer from 1 to 10000.

According to the present invention, it is preferred to use linear silicone polymers comprising terminal groups x and Y at least one of which comprising a functional group capable of reacting with a crosslinking agent. It is preferable to use a silicone polymer which can be either addition-crosslinked or condensation-crosslinked.

The term "addition-crosslinked" or "addition-crosslinkable" means that the polymer comprises at least one functional group which may react with a crosslinking agent via an addition reaction. A typical example is that the polymer comprises at least one double bond preferably two double bonds, which may undergo an electrophilic addition reaction with an appropriate crosslinking agent. A preferred embodiment according to the present invention is a silicone polymer which comprises terminal groups X and Y possessing double bonds, for example vinyl groups. An example is the commercial product Silopren Ul, a vinyl-terminated polydimethylsiloxane sold by GE Bayer Silicones.

The term "condensation-crosslinked" or "condensation crosslinkable" means that the polymer comprises at least one functional group which may react with a crosslinking agent via a condensation reaction. A typical example is that the polymer comprises at least one hydroxyl group, preferably two hydroxyl groups, which may undergo a condensation reaction with an appropriate crosslinking agent, for example a crosslinking agent comprising alkoxy silicates. A preferred embodiment according to the present invention is a silicone polymer which comprises as terminal groups X and/or Y hydroxyl groups. An example is the commercial product Silopren C2, a hydroxy-terminated polydimethylsiloxane sold by GE Bayer Silicones.

According to the present invention, the molecular weight of the silicone polymer is chosen such that the required viscosity and tensile strength are obtained. Optionally, additives such as rheology modifiers may be added for adjustment of said parameters.

Polyurethanes are polymers which are obtainable by reaction of a polyisocyanate, preferably a diisocyanate, with a polyol, such as a polyether polyol or polyester polyol. As to the presence of functional groups which render the polymer crosslinkable, as well as to the molecular weight of the polymer, the above statements with respect to silicone polymers equally apply, Polyethers are polymers comprising ether groups in their repeating unit. Polyether prepolymers may be obtained, for example, from epoxides. As to the presence of functional groups which render the polymer crosslinkable (e.g. aziridine groups), as well as to the molecular weight of the polymer, the above statements with respect to silicone polymers equally apply.

Polyacrylates are polymers which are obtained by polymerization of acrylate monomers, such as methyl methacrylates (MMA). As to the presence of functional groups which render the polymer crosslinkable as well as to the molecular weight of the polymer, the above statements with respect to silicone polymers equally apply.

Styrene-butadiene-copolymers may be obtained by copolymerization of these monomers. As to the presence of functional groups which render the polymer crosslinkable, as well as to the molecular weight of the polymer, the above statements with respect to silicone polymers equally apply.

Methyl methacrylates-copolymers may be obtained by co-polymerizing methyl methacrylates with a suitable monomer. As to the presence of functional groups which render the polymer crosslinkable, as well as to the molecular weight of the polymer, the above statements with respect to silicone polymers equally apply.

The above polymers as well as the details of their synthesis are well-known to the skilled man and need not be described here.

The above polymers may be additionally mixed with conventional additives, such as rheology modifiers, fillers etc., which are well-known to the skilled man and used for adjusting the properties of the polymers. Examples of such additives are highly-dispersed silica, paraffin oil, surfactants, fillers, and pre-polymeric resins such as silicone resins.

The above polymeric mass is used according to the present invention with an appropriate crosslinker capable of reacting with the polymer. The reaction between the polymer and the crosslinker causes the curing of the layer applied onto the developed fingerprint. The nature of the crosslinker to be used depends upon the kind of polymer, i.e. which functional groups are present in the polymer.

For example, in the case of the above-mentioned addition-crosslinkable silicone polymer, an appropriate crosslinker is a reagent capable of reacting with said polymer via an addition reaction. According to a preferred embodiment of the present invention, the polymeric mass is the commercial product Silopren U1, a vinyl-terminated polydimethylsiloxane sold by GE Bayer Silicones. This polymer may be used, for example, together with the commercially available crosslinking agent Silopren U crosslinker 430 sold by GE Bayer Silicones, which is a polydimethyl hydrogen methyl siloxane comprising Si—H bonds. Said Si—H bonds may react with the vinyl groups in the Silopren Ul.

In the case of the above-mentioned condensation-crosslinkable silicone polymer, an appropriate crosslinker is a reagent capable of reacting with said polymer via a condensation reaction. According to a preferred embodiment of the present invention, the polymeric mass is the commercial product Silopren C2, a hydroxy-terminated polydimethylsiloxane sold by GE Bayer Silicones. This polymer may be used, for example, together with the commercially available crosslinking agent Silopren C crosslinker 25 sold by GE Bayer Silicones, which is a mixture of alkoxy silicates and organotin compounds.

The reaction between the polymer and the crosslinking agent is typically accelerated by the use of a catalyst. Catalysts for the respective reactions are well-known. For example, for the above addition-crosslinkable silicone polymer, a suitable catalyst is the Silopren catalyst Pt/D sold by GE Bayer Silicones, which is a platinum complex in divinyl polymethylsiloxane.

Thus, the present invention is also related to a kit for the registration of fingerprints, comprising a clear polymer, preferably as described above, and a suitable crosslinking agent. Optionally, the kit may comprise a suitable catalyst. Furthermore, the kit may optionally comprise a developing agent.

According to the present invention, the kit may be one-component or two-component kit. A one-component kit is a system where the polymeric mass and the crosslinker are stored together in e.g. the same compartment, but will only undergo the crosslinking reaction after being released and brought in contact with air humidity. A two-component kit is a kit where the polymeric mass and the crosslinker are stored separately, e.g. in different compartments.

In said kit, the polymer may also be present dissolved in a suitable solvent.

According to a preferred embodiment of the present invention, the kit comprises Silopren Ul as polymeric mass, Silopren U Crosslinker as suitable crosslinker capable of undergoing an addition reaction with Silopren Ul, and Silopren U catalyst as a suitable catalyst, According to another preferred embodiment of the present invention, the kit comprises Silopren C2 as polymeric mass, and Silopren U Crosslinker 25 as suitable crosslinker capable of under-going a condensation reaction with said polymer.

The amounts of the components to be used are easily determined by a skilled man on a routine basis and adjusted to his personal needs. A typical ratio of polymeric mass to crosslinker according to the present invention is 1:1 to 100:1. Catalysts are typically used in low amounts, i.e. amounts sufficient for obtaining the desired curing times but still not constituting a significant impurity.

Typical total amounts for all of the components to be used according the present invention lie in a range of from 1 to 20 g, preferably 3 to 10 g.

The developing agent which can be used in the kit of the present invention may be any developing agent conventionally used in the art of developing fingerprints. Examples are powders such as carbon black, aluminum powder, or magnetic or fluorescent powders.

The present invention is furthermore related to a process for the registration of fingerprints, comprising the steps of
a) developing a fingerprint on a surface;
b) mixing a clear polymer with a suitable crosslinker, optionally in the presence of a suitable catalyst;
c) immediately applying the mixture obtained in step b) onto the developed fingerprint and allowing said mixture to form a cured clear layer; and
d) lifting the cured layer obtained in step c) and comprising an impression of said fingerprint off of said surface.

According to the present invention, the development of a fingerprint may be carried as conventionally performed in the art. Thus, a developing agent such as, for example, carbon black powder, is distributed over the surface to be examined for the presence of fingerprints. Subsequently, the surface to be examined is swept with a brush so that the developing agent adheres to any present latent fingerprint, which in this way becomes developed, i.e. visible.

The clear crosslinkable polymeric mass is mixed with a suitable crosslinker, optionally in the presence of a catalyst. Preferably, the components are put on a separate object, such as a piece of paper, and thoroughly mixed, e.g. by using a stick. The mixing of the components may be performed by hand-mixing. It is also possible to perform automatic mixing using a conventional cartridge system with a static mixer.

Immediately thereafter, the mixture thus obtained is applied on the developed fingerprint. This has to be done quickly since curing of the mixture starts instantaneously. The mixture may be cast onto the developed fingerprint. Alternately, it may be scraped off the object where admixture has been performed, for example by using a stick, and then placed on the developed fingerprint. Optionally and if necessary, the applied layer consisting of said mixture may be smoothened, e.g. by using a plastic foil.

Once put onto the developed fingerprint, the mixture is allowed to cure. Typical curing times according to the present invention are several minutes, for example 3 to 10 minutes, preferably 4 to 6 minutes, under standard environmental conditions (23° C.). Of course, curing times depend on the environmental conditions and may be shorter at elevated temperatures or longer at low temperatures.

The mixture is applied onto the fingerprint in such an amount that a cured clear layer is formed having a thickness not exceeding 5 mm. Thicker layers significantly deteriorate or even completely prevent the taking of photographs through said cured clear layer since with increasing thickness the brilliance of the photography taken through said layer decreases as well as the danger of inclusions of air increases, it is preferred to have a thickness of the cured layer which does not exceed 1 mm, preferably not exceed 0.5 mm and most preferably is lens than 0.4 mm After the layer has cured, the thus formed clear cured layer may be lifted off of the surface comprising the original fingerprint. The clear cured layer contains a negative impression of the original fingerprint, which however is otherwise identical to the original fingerprint.

It is now possible to take a photograph of said fingerprint impression contained in said cured layer from the upper side of said layer, i.e. from the side remote from said impression. According to the present invention, any device for taking photographies which is conventionally used in the art is suitable for that purpose. If desired, the clear cured layer may be put on a white or colored surface, for example a piece of white paper, for the taking of the photograph.

Since the photograph is taken from the upper side of said cured layer, the image of the fingerprint becomes once again reversed, resulting in a "positive" fingerprint reproduction. It is the achievement of the present invention to provide, for the first time, a polymeric mass and a process employing said mass which allow said "positive" fingerprint reproduction.

According to the present invention, in principle any polymeric mass which forms a clear layer having the required physical parameters such as thickness, viscosity and tensile strength may be used in the above process. It is preferred that the cured layer may be formed from a polymeric mass selected from the group consisting of silicone polymers, polyurethane polymers, polyether polymers, polyacrylates, styrene-butadiene-copolymers, and methyl methacrylate copolymers. It is especially preferred that the cured layer may be formed from the above-described polymeric masses and kits.

Thus, the present invention teaches the use of a clear crosslinkable polymeric mass for the registration of fingerprints. It is preferred that the cured layer may be formed from a polymeric mass selected from the group consisting of silicone polymers, polyurethane polymers, polyether polymers, polyacrylates, styrene-butadiene-copolymers, and methyl methacrylate copolymers. It is especially preferred that the cured layer may be formed from the above-described polymeric masses and kits.

The main application for the polymeric masses and kits according to the present invention is the registration of fingerprints. However, the masses and kits may also be used for the registration of other traces such as for example traces made by a pencil.

It is also possible, by means of the masses and kits according to the present invention, to register fingerprints from the surface of a paper or a sucking material.

The present invention is further illustrated by non-limiting examples and drawings.

FIG. 1 shows a photograph of a fingerprint taken through a clear cured layer according to the present invention.

EXAMPLE 1

A clear cured layer according to the present invention was prepared as follows on the basis of an addition-crosslinkable silicone polymer:

| Component A: | 99.9 g | Silopren U1 |
|---|---|---|
|  | 0.1 g | Silopren U Catalyst Pt/D |
| Component B: | 90.0 g | Silopren U1 |
|  | 10.0 g | Silopren U Crosslinker 430 |

The chemical nature of these components has been described above

The components A and B were thoroughly mixed with each other on a piece of paper and immediately applied onto a glass plate, on which a fingerprint was created and developed using carbon black as developing agent.

The mixture was put onto the glass plate using a plastic foil, so that a layer having a thickness of 0.35 mm was obtained. The layer was allowed to cure for about 5 minutes.

The cured layer was lifted off of the glass plate A photograph was taken through said layer from the upper side, resulting in a photograph showing the positive impression of the fingerprint. The photograph is shown in FIG. 1. No further processing of the photograph was carried out.

EXAMPLE 2

A clear cured layer according to the present invention was prepared as follows on the basis of a condensation-crosslinkable silicone polymer:

| Component A: | 1.0 g | Silopren C Crosslinker 25 |
| Component B: | 99.0 g | Silopren C2 |

The chemical nature of these components has been described above.

A clear cured layer comprising a fingerprint impression was generated as described above in Example 1.

The invention claimed is:

1. Process for the registration of fingerprints, comprising the steps of
   a) developing a fingerprint on a surface;
   b) mixing a clear crosslinkable polymeric mass with a suitable crosslinker, optionally in the presence of a suitable catalyst;
   c) immediately applying the mixture obtained in step b) onto the developed fingerprint and allowing said mixture to form a cured clear layer;
   d) lifting the cured layer obtained in step c) and comprising an impression of said fingerprint off of said surface, wherein the impression of said fingerprint is on a lower side of said lifted cured layer; and
   e) taking a photograph through said lifted cured layer obtained in step d) from an opposing side to said lower side where the impression of said fingerprint is located, thereby resulting in a positive fingerprint reproduction.

2. Process according to claim 1, wherein said clear crosslinkable polymeric mass is selected from the group consisting of silicone polymers, polyurethane polymers, polyether polymers, polyacrylates, styrene-butadiene-copolymers, and methyl methacrylate copolymers.

3. Process according to claim 2, wherein said mass comprises a clear crosslinkable polymeric mass selected from the group consisting of silicone polymers, polyurethane polymers, polyether polymers, polyacrylates, styrene-butadiene-copolymers, and methyl methacrylate copolymers, wherein said mass has a viscosity of from 0.1 to 200 Pas and a tensile strength of from 0.1 to 5 MPa.

4. Process according to claim 1, wherein the cured layer obtained in step d) has a thickness not exceeding 5 mm.

5. Process according to claim 4, wherein said cured layer has a thickness of less than 0.4 mm.

* * * * *